United States Patent
Watanabe et al.

(10) Patent No.: US 8,337,933 B2
(45) Date of Patent: *Dec. 25, 2012

(54) PREPARATION OF OYSTER FLESH EXTRACTS

(75) Inventors: Mitsugu Watanabe, Tokyo (JP); Takayuki Watanabe, Tokyo (JP); Tomio Watanabe, Tokyo (JP)

(73) Assignee: Watanabe Oyster Laboratory Co., Ltd., Hachioji-shi, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/277,513

(22) Filed: Oct. 20, 2011

(65) Prior Publication Data

US 2012/0034357 A1    Feb. 9, 2012

Related U.S. Application Data

(60) Division of application No. 12/846,004, filed on Jul. 29, 2010, which is a division of application No. 12/578,884, filed on Oct. 14, 2009, now Pat. No. 7,820,224, which is a continuation of application No. 11/248,611, filed on Oct. 13, 2005, now abandoned.

(30) Foreign Application Priority Data

| Apr. 28, 2005 | (JP) | 2005-132306 |
| Apr. 28, 2005 | (JP) | 2005-132307 |
| Apr. 28, 2005 | (JP) | 2005-132308 |
| Apr. 28, 2005 | (JP) | 2005-132309 |

(51) Int. Cl.
    *A23L 1/28* (2006.01)

(52) U.S. Cl. ........ 426/643; 426/437; 426/465; 426/472; 426/478

(58) Field of Classification Search .................. 426/643, 426/425–437, 465, 443, 471–472, 478, 480
See application file for complete search history.

(56) References Cited

U.S. PATENT DOCUMENTS 1,925,559 A    9/1933    Hickman
(Continued)

FOREIGN PATENT DOCUMENTS

JP    59-118057 A    7/1984
(Continued)

OTHER PUBLICATIONS

Translation of JP 10136946.* Verified English translation of Japanese Patent Application No. 2001-149049.

*Primary Examiner* — Drew E Becker
(74) *Attorney, Agent, or Firm* — Westerman, Hattori, Daniels & Adrian, LLP

(57) ABSTRACT

The invention relates to the preparation of oyster flesh extracts. Raw oyster flesh is placed in an extractor with a solution stored in it. The extractor is closed up tight and pressurized to 1 atm to extract oyster flesh extracts from the raw oyster flesh, and they are fed into the solution in the extractor. An extraction solution with the oyster flesh extracts is fed in concentrated solution to precipitate out the oyster flesh extracts. The precipitates are dried into dry oyster flesh extracts. The extractor is then closed up tight and pressurized to 0.1 atm to 0.2 atm to extract a second portion oyster flesh extracts from the raw oyster flesh, and they are fed into the solution in the extractor. The precipitates are dried into dry oyster flesh extracts.

4 Claims, 3 Drawing Sheets

The (theoretical) contents of trace elements in 100 g of dry matter, and the weight of dry matter prepared from 20 kg of raw oysters

| NO | | Zn (mg) | Se (μg) | Fe (mg) | weight of dry matter prepared from 20 kg of raw oysters (g) |
|---|---|---|---|---|---|
| 1 | 1pressure 80minutes | 24.4/100g | 125.4/100g | 4.22/100g | 772.2 |
| 2 | 0.1~0.2pressure 60minutes | 22.1/100g | 136.0/100g | 4.80/100g | 1187 |
| 3 | 0.1~0.2pressure 53minutes | 24.7/100g | 137.0/100g | 5.08/100g | 1195 |

U.S. PATENT DOCUMENTS

| | | |
|---|---|---|
| 2,150,684 A | 3/1939 | Hickman |
| 2,350,768 A | 6/1944 | Kellog et al. |
| 3,256,098 A | 6/1966 | Ohtaki |
| 3,603,240 A | 9/1971 | McCarthy |
| 4,601,906 A | 7/1986 | Shindler |
| 4,832,951 A | 5/1989 | Chang-Diaz |
| 4,929,462 A | 5/1990 | Moorman et al. |
| 4,968,523 A | 11/1990 | Usui et al. |
| 4,981,699 A | 1/1991 | Inada et al. |
| 5,843,514 A | 12/1998 | Yamada et al. |
| 5,939,111 A | 8/1999 | Yonemitsu et al. |
| 6,225,483 B1 | 5/2001 | Franke |
| 6,884,456 B2 | 4/2005 | Tafu et al. |

FOREIGN PATENT DOCUMENTS

| | | |
|---|---|---|
| JP | 61-58557 A | 3/1986 |
| JP | 10-136946 A | 5/1998 |
| JP | 2001-149049 A | 6/2001 |

* cited by examiner

Fig. 1

The (theoretical) contents of trace elements in 100 g of dry matter, and the weight of dry matter prepared from 20 kg of raw oysters

| NO | | Zn (mg) | Se (μg) | Fe (mg) | Cu (mg) | weight of dry matter prepared from 20 kg of raw oysters (g) |
|---|---|---|---|---|---|---|
| 1 | 1pressure 80minutes | 24.4 /100g | 125.4/100g | 4.22/100g | 4.73/100g | 772.2 |
| 2 | 1.5pressure 20minutes | 26.1/100g | 129.6/100g | 3.52/100g | 4.93/100g | 958.5 |
| 3 | 1.5pressure 40minutes | 27.74/100g | 108.6/100g | 3.87/100g | 3.67/100g | 1054.8 |
| 4 | 2pressure 20minutes | 23.2/100g | 111.7/100g | 2.87/100g | 3.38/100g | 956.9 |
| 5 | 2pressure 30minutes | 22.3/100g | 103.9/100g | 3.17/100g | 4.49/100g | 943.4 |
| 6 | after 1pressure 80minutes, 1.5pressure 20minutes | 32.7/100g | 109.5/100g | 5.84/100g | 4.11/100g | 306.6   total 1078.8 |
| 7 | after 1pressure 80minutes, 1.5pressure 40minutes | 20.9/100g | 127.3/100g | 4.34/100g | 4.34/100g | 416.5   total 1188.7 |

Fig.2

The (theoretical) contents of trace elements in 100 g of dry matter, and the weight of dry matter prepared from 20 kg of raw oysters

| NO | | Zn (mg) | Se ($\mu$g) | Fe (mg) | weight of dry matter prepared from 20 kg of raw oysters (g) |
|---|---|---|---|---|---|
| 1 | 1pressure 80minutes | 24.4/100g | 125.4/100g | 4.22/100g | 772.2 |
| 2 | 0.1~0.2pressure 60minutes | 22.1/100g | 136.0/100g | 4.80/100g | 1187 |
| 3 | 0.1~0.2pressure 53minutes | 24.7/100g | 137.0/100g | 5.08/100g | 1195 |

Fig.3 the contents of trace elements in 100 g of dry matter

| NO | | Zn (mg) | Se ($\mu$g) |
|---|---|---|---|
| 1 | normal-pressure heating concentration | 26.0/100g | 78/100g |
| 2 | reduced-pressure, low-temperature heating concentration | 31.4/100g | 101/100g |

PREPARATION OF OYSTER FLESH EXTRACTS

INCORPORATED-BY-REFERENCE TO RELATED APPLICATIONS

This application is a divisional of U.S. application Ser. No. 12/846,004, filed Jul. 29, 2010; which is a divisional of U.S. application Ser. No. 12/578,884, filed Oct. 14, 2009; which is a continuation of U.S. Ser. No. 11/248,611, filed Oct. 13, 2005, and is based upon and claims the benefit of priority from the prior Japanese Patent Application Nos. 2005-132306, filed Apr. 28, 2005; 2005-132307, filed Apr. 28, 2005; 2005-132308, filed Apr. 28, 2008; and 2005-132309, filed on Apr. 28, 2008, the entire contents of which are incorporated by reference.

The present invention relates to a method of preparing oyster flesh extracts by concentration and precipitation, which ensures efficient extraction of oyster flesh extracts from oyster flesh such as raw oyster flesh, and efficient collection of them in larger amounts without deterioration by heat denaturation in useful effective components in those extracts.

BACKGROUND ART

In recent years, oyster flesh extracts have commanded a lot more growing attention as impeccable health-food supplements containing more effective substances.

Thus, there are now commercially available health-food supplements based on oyster flesh extracts extracted by a variety of extraction methods. In this regard, for instance, see JP(A)10-136946.

For the extraction of such oyster flesh extracts, on the other hand, it is still desired to have an efficient method of obtaining oyster flesh extracts containing large amounts of nutrient sources such as glycogens, taurine and proteins, and so-called platelet-aggregation inhibition substances such as zinc.

SUMMARY OF THE INVENTION

Such being the case, the primary object of the invention is to provide a method of preparing oyster flesh extracts with an improved degree of extraction, which contain ever larger amounts of useful nutrient sources such as taurine, glycogens and proteins, so-called platelet-aggregation inhibition substances such as zinc and selenium, and other useful substances such as vitamins.

Thus, the present invention provides a method of preparing oyster flesh extracts, characterized by comprising:

an extraction step of placing raw oyster flesh in an extractor with a solution stored therein, closing up said extractor and pressurizing said raw oyster flesh to 1 atm or higher to extract oyster flesh extracts from said raw oyster flesh in a pressurized state, and feeding said oyster flesh extracts into said solution in said extractor, a concentration step of concentrating an extraction solution with said oyster flesh extracts fed therein, a precipitation step of adding an alcohol solution to a solution concentrated in said concentration step to precipitate out said oyster flesh extracts, and a formation step of drying precipitates obtained in said precipitation step into dry oyster flesh extracts.

The invention also provides a method of preparing oyster flesh extracts, characterized by comprising:

a first extraction step of placing raw oyster flesh in an extractor with a solution stored therein, and putting said raw oyster flesh in a normal pressure state in said extractor to extract a portion of oyster flesh extracts from said raw oyster flesh, and feeding said portion of oyster flesh extracts into said extraction solution, a first concentration step of concentrating said extraction solution with said portion of oyster flesh extracts fed therein, a first precipitation step of adding an alcohol solution to a solution concentrated in said first concentration step to precipitate out said portion of oyster flesh extracts, a first formation step of drying precipitates obtained in said first precipitation step into dry oyster flesh extracts, a second extraction step of again placing said raw oyster flesh used in said first extraction step in an extractor with a solution stored therein, pressurizing said raw oyster flesh to 1 atm or higher in said extractor to extract another portion of oyster flesh extracts from said raw oyster flesh in a pressurized state, and feeding said another portion of oyster flesh extracts in an extraction solution, a second concentration step of concentrating said extraction solution with said another portion of oyster flesh extracts fed therein, a second precipitation step of adding an alcohol solution to a solution concentrated in said second concentration step to precipitate out said another portion of oyster flesh extracts, and a second formation step of drying precipitates obtained in said second precipitation step into dry oyster flesh extracts.

Further, the invention provides a method of preparing oyster flesh extracts, characterized by comprising:

an extraction step of placing raw oyster flesh in an extractor with a solution stored therein, closing up said extractor and putting said raw oyster flesh under a reduced pressure of 1 atm or lower to extract oyster flesh extracts from said raw oyster flesh in a reduced-pressure state, and feeding said oyster flesh extracts into said solution in said extractor, a concentration step of concentrating an extraction solution with said oyster flesh extracts fed therein, a precipitation step of adding an alcohol solution to a solution concentrated in said concentration step to precipitate out said oyster flesh extracts, and a formation step of drying precipitates obtained in said precipitation step into dry oyster flesh extracts.

Further, the invention provides a method of preparing oyster flesh extracts, characterized by comprising:

a first extraction step of placing raw oyster flesh in an extractor with a solution stored therein, and putting said raw oyster flesh in a normal pressure state in said extractor to extract a portion of oyster flesh extracts from said raw oyster flesh, and feeding said portion of oyster flesh extracts into an extraction solution, a first concentration step of concentrating said extraction solution with said portion of oyster flesh extracts fed therein, a first precipitation step of adding an alcohol solution to a solution concentrated in said first concentration step to precipitate out said portion of oyster flesh extracts, a first formation step of drying precipitates obtained in said first precipitation step into dry oyster flesh extracts, a second extraction step of again placing said raw oyster flesh used in said first extraction step in an extractor with a solution stored therein, putting said raw oyster flesh under a reduced pressure of 1 atm or lower in said extractor to extract another portion of oyster flesh extracts from said raw oyster flesh in a reduced-pressure state, and feeding said another portion of oyster flesh extracts in said extraction solution, a second concentration step of concentrating said extraction solution with said another portion of oyster flesh extracts fed therein, a second precipitation step of adding an alcohol solution to a solution concentrated in said second concentration step to precipitate out said another portion of oyster flesh extracts, and a second formation step of drying precipitates obtained in said second precipitation step into dry oyster flesh extracts.

Further, the invention provides a method of preparing oyster flesh extracts, characterized by comprising:

a selective extraction step of selecting either a pressure extraction step of placing raw oyster flesh in an extractor with a solution stored therein, closing up said extractor and pressurizing said raw oyster flesh to 1 atm or higher to extract oyster flesh extracts from said raw oyster flesh in a pressurized state or a reduced-pressure extraction step of putting said raw oyster flesh under a reduced pressure of 1 atm or lower in said extractor to extract oyster flesh extracts from said raw oyster flesh in a reduced-pressure state, a feed step of extracting oyster flesh extracts from said raw oyster flesh in either said pressure extraction step or said reduced-pressure extraction step, and feeding said oyster flesh extracts into said solution in said extractor, a concentration step of concentrating an extraction solution with said oyster flesh extracts fed therein, a precipitation step of adding an alcohol solution to a solution concentrated in said concentration step to precipitate out said oyster flesh extracts, and a formation step of drying precipitates obtained in said precipitation step into dry oyster flesh extracts.

Further, the invention provides a method of preparing oyster flesh extracts, characterized by comprising:

a first extraction step of placing raw oyster flesh in an extractor with a solution stored therein, and putting said raw oyster flesh in a normal pressure state in said extractor to extract a portion of oyster flesh extracts from said raw oyster flesh, and feeding said portion of oyster flesh extracts into said extraction solution, a first concentration step of concentrating said extraction solution with said portion of oyster flesh extracts fed therein, a first precipitation step of adding an alcohol solution to a solution concentrated in said first concentration step to precipitate out said portion of oyster flesh extracts, a first formation step of drying precipitates obtained in said first precipitation step into dry oyster flesh extracts, a selective extraction step of selecting either a pressure extraction step of again placing said raw oyster flesh used in said first extraction step in an extractor with a solution stored therein, and pressurizing said ray oyster flesh to 1 atm or higher in said extractor to extract another portion of oyster flesh extracts from said raw oyster flesh in a pressurized state or a reduced-pressure extraction step of putting said raw oyster flesh under a reduced pressure of 1 atm or lower in said extractor to extract another portion of oyster flesh extracts from said raw oyster flesh in a reduced-pressure state, a second feed step of feeding said another portion of oyster flesh extracts obtained in either said pressure extraction step or said reduced-pressure extraction step into an extraction solution, a second concentration step of concentration said extraction solution with said another portion of oyster flesh extracts fed therein, a second precipitation step of adding an alcohol solution to a solution concentrated in said second concentration step, and a second formation step of drying precipitates obtained in said second precipitation step into dry oyster flesh extracts.

Further, the invention provides a method of preparing oyster flesh extracts, characterized by comprising:

an extraction step of placing raw oyster flesh in an extractor with a solution stored therein, extracting oyster flesh extracts from said raw oyster flesh in said extractor, and feeding said oyster flesh extracts into said solution in said extractor, a concentration step of concentrating an extraction solution with said oyster flesh extracts fed therein, a precipitation step of adding an alcohol solution to a solution concentrated in said concentration step to precipitate out said oyster flesh extracts, and a formation step of drying precipitates obtained in said precipitation step into dry oyster flesh extracts, wherein:

in said concentration step, said extraction solution is put under a reduced pressure of 1 atm or lower and concentrated by low-temperature heating in a reduced-pressure state, and in said precipitation step, said alcohol solution is added to said concentrated solution in said concentration step, and the resultant solution is stirred and let stand for separation into a supernatant liquid portion and a precipitate portion at a ratio of 0.5:9.5 to 2.5:7.5.

Further, the invention provides a method of preparing oyster flesh extracts, characterized by comprising:

an extraction step of placing raw oyster flesh in an extractor with a solution stored therein, closing up said extractor and pressurizing said raw oyster flesh to 1 atm or higher to extract oyster flesh extracts from said raw oyster flesh in a pressurized state, and feeding said oyster flesh extracts into said solution in said extractor, a concentration step of concentrating an extraction solution with said oyster flesh extracts fed therein, a precipitation step of adding an alcohol solution to a solution concentrated in said concentration step to precipitate out said oyster flesh extracts, and a formation step of drying precipitates obtained in said precipitation step into dry oyster flesh extracts, wherein:

in said concentration step, said extraction solution is put under a reduced pressure of 1 atm or lower and concentrated by low-temperature heating in a reduced-pressure state, and in said precipitation step, said alcohol solution is added to said concentrated solution in said concentration step, and the resultant solution is stirred and let stand for separation into a supernatant liquid portion and a precipitate portion at a ratio of 0.5:9.5 to 2.5:7.5.

Further, the invention provides a method of preparing oyster flesh extracts, characterized by comprising:

a first extraction step of placing raw oyster flesh in an extractor with a solution stored therein, and putting said raw oyster flesh in a normal pressure state in said extractor to extract a portion of oyster flesh extracts from said raw oyster flesh, and feeding said portion of oyster flesh extracts into said extraction solution, a first concentration step of concentrating said extraction solution with said portion of oyster flesh extracts fed therein, a first precipitation step of adding an alcohol solution to a solution concentrated in said first concentration step to precipitate out said portion of oyster flesh extracts, a first formation step of drying precipitates obtained in said first precipitation step into dry oyster flesh extracts, a second extraction step of again placing said raw oyster flesh used in said first extraction step in an extractor with a solution stored therein, pressurizing said raw oyster flesh to a pressure of 1 atm or higher in said extractor to extract another portion of oyster flesh extracts from said raw oyster flesh in a pressurized state, and feeding said another portion of oyster flesh extracts in said extraction solution, a second concentration step of concentrating an extraction solution with said another portion of oyster flesh extracts fed therein, a second precipitation step of adding an alcohol solution to a solution concentrated in said second concentration step to precipitate out said another portion of oyster flesh extracts, and a second formation step of drying precipitates obtained in said second precipitation step into dry oyster flesh extracts, wherein:

in each of said concentration steps, said extraction solution is put under a reduced pressure of 1 atm or lower and concentrated by low-temperature heating in a reduced-pressure state, and in each of said precipitation steps, said alcohol solution is added to said concentrated solution in said concentration step, and the resultant solution is stirred and let stand for separation into a supernatant liquid portion and a precipitate portion at a ratio of 0.5:9.5 to 2.5:7.5.

Further, the invention provides a method of preparing oyster flesh extracts, characterized by comprising:

an extraction step of placing raw oyster flesh in an extractor with a solution stored therein, closing up said extractor and putting said ray oyster flesh under a reduced pressure of 1 atm or lower to extract oyster flesh extracts from said raw oyster flesh in a reduced-pressure state, and feeding said oyster flesh extracts into said solution in said extractor, a concentration step of concentrating an extraction solution with said oyster flesh extracts fed therein, a precipitation step of adding an alcohol solution to a solution concentrated in said concentration step to precipitate out said oyster flesh extracts, and a formation step of drying precipitates obtained in said precipitation step into dry oyster flesh extracts, wherein:

in said concentration step, said extraction solution is put under a reduced pressure of 1 atm or lower and concentrated by low-temperature heating in a reduced-pressure state, and in said precipitation step, said alcohol solution is added to said concentrated solution in said concentration step, and the resultant solution is stirred and let stand for separation into a supernatant liquid portion and a precipitate portion at a ratio of 0.5:9.5 to 2.5:7.5.

Further, the invention provides a method of preparing oyster flesh extracts, characterized by comprising:

a first extraction step of placing raw oyster flesh in an extractor with a solution stored therein, and putting said raw oyster flesh in a normal pressure state in said extractor to extract a portion of oyster flesh extracts from said raw oyster flesh, and feeding said portion of oyster flesh extracts into an extraction solution, a first concentration step of concentrating said extraction solution with said portion of oyster flesh extracts fed therein, a first precipitation step of adding an alcohol solution to a solution concentrated in said first concentration step to precipitate out said portion of oyster flesh extracts, a first formation step of drying precipitates obtained in said first precipitation step into dry oyster flesh extracts, a second extraction step of again placing said raw oyster flesh used in said first extraction step in an extractor with a solution stored therein, putting said raw oyster flesh under a reduced pressure of 1 atm or lower in said extractor to extract another portion of oyster flesh extracts from said raw oyster flesh in a reduced-pressure state, and feeding said another portion of oyster flesh extracts in said extraction solution, a second concentration step of concentrating said extraction solution with said another portion of oyster flesh extracts fed therein, a second precipitation step of adding an alcohol solution to a solution concentrated in said second concentration step to precipitate out said another portion of oyster flesh extracts, and a second formation step of drying precipitates obtained in said second precipitation step into dry oyster flesh extracts, wherein:

in each of said concentration steps, said extraction solution is put under a reduced pressure of 1 atm or lower and concentrated by low-temperature heating in a reduced-pressure state, and in each of said precipitation steps, said alcohol solution is added to said concentrated solution in said concentration step, and the resultant solution is stirred and let stand for separation into a supernatant liquid portion and a precipitate portion at a ratio of 0.5:9.5 to 2.5:7.5.

Further, the invention provides a method of preparing oyster flesh extracts, characterized by comprising:

a selective extraction step of selecting either a pressure extraction step of placing raw oyster flesh in an extractor with a solution stored therein, closing up said extractor and pressurizing said raw oyster flesh to 1 atm or higher to extract oyster flesh extracts from said raw oyster flesh in a pressurized state or a reduced-pressure extraction step of putting said raw oyster flesh under a reduced pressure of 1 atm or lower in said extractor to extract oyster flesh extracts from said raw oyster flesh in a reduced-pressure state, a feed step of extracting oyster flesh extracts from said raw oyster flesh in either said pressure extraction step or said reduced-pressure extraction step, and feeding said oyster flesh extracts into said solution in said extractor, a concentration step of concentrating an extraction solution with said oyster flesh extracts fed therein, a precipitation step of adding an alcohol solution to a solution concentrated in said concentration step to precipitate out said oyster flesh extracts, and a formation step of drying precipitates obtained in said precipitation step into dry oyster flesh extracts, wherein:

in said concentration step, said extraction solution is put under a reduced pressure of 1 atm or lower and concentrated by low-temperature heating in a reduced-pressure state, and in said precipitation step, said alcohol solution is added to said concentrated solution in said concentration step, and the resultant solution is stirred and let stand for separation into a supernatant liquid portion and a precipitate portion at a ratio of 0.5:9.5 to 2.5:7.5.

Further, the invention provides a method of preparing oyster flesh extracts, characterized by comprising:

a first extraction step of placing raw oyster flesh in an extractor with a solution stored therein, and putting said raw oyster flesh in a normal pressure state in said extractor to extract a portion of oyster flesh extracts from said raw oyster flesh, and feeding said portion of oyster flesh extracts into said extraction solution, a first concentration step of concentrating said extraction solution with said portion of oyster flesh extracts fed therein, a first precipitation step of adding an alcohol solution to a solution concentrated in said first concentration step to precipitate out said portion of oyster flesh extracts, a first formation step of drying precipitates obtained in said first precipitation step into dry oyster flesh extracts, a selective extraction step of selecting either a pressure extraction step of again placing said raw oyster flesh used in said first extraction step in an extractor with a solution stored therein, and pressurizing said raw oyster flesh to 1 atm or higher in said extractor to extract another portion of oyster flesh extracts from said raw oyster flesh in a pressurized state or a reduced-pressure extraction step of putting said ray oyster flesh under a reduced pressure of 1 atm or lower in said extractor to extract another portion of oyster flesh extracts from said raw oyster flesh in a reduced-pressure state, a second feed step of feeding said another portion of oyster flesh extracts obtained in either said pressure extraction step or said reduced-pressure extraction step into an extraction solution, a second concentration step of concentration said extraction solution with said another portion of oyster flesh extracts fed therein, a second precipitation step of adding an alcohol solution to a solution concentrated in said second concentration step, and a second formation step of drying precipitates obtained in said second precipitation step into dry oyster flesh extracts, wherein:

in each of said concentration steps, said extraction solution is put under a reduced pressure of 1 atm or lower and concentrated by low-temperature heating in a reduced-pressure state, and in each of said precipitation steps, said alcohol solution is added to said concentrated solution in said concentration step, and the resultant solution is stirred and let stand for separation into a supernatant liquid portion and a precipitate portion at a ratio of 0.5:9.5 to 2.5:7.5.

Advantages of the Invention

According to the oyster flesh extract preparation method of the invention using a reduced-pressure, low-temperature heating concentration process, it is possible to obtain oyster flesh extracts with improved efficiency, which contain ever larger amounts of useful nutrients such as glycogens, taurine and proteins, platelet-aggregation inhibition substances such as zinc, and other helpful substances.

BRIEF DESCRIPTION OF THE DRAWINGS

FIG. 1 is a table illustrative of the (theoretical) contents of trace elements in 100 g of dry matter, and the weight of dry matter prepared from 20 kg of raw oysters, in the case of pressure extraction.

FIG. 2 is a table illustrative of the (theoretical) contents of trace elements in 100 g of dry matter, and the weight of dry matter prepared from 20 kg of raw oysters, in the case of reduced-pressure extraction.

FIG. 3 is a table illustrative of the contents of trace elements in 100 g of dry matter in the case of normal-pressure heating concentration, and reduced-pressure, low-temperature heating concentration.

BEST MODE OF CARRYING OUT THE INVENTION

The present invention is now explained with reference to its preferable embodiments.

(1) Pressure Extraction of Oyster Flesh Extracts

First, there is provided a so-called hemi-spherical extractor with water or other solution stored therein. Then, chucked raw oyster flesh is carefully placed in the extractor as it is, that is, without being grounded.

Subsequently, the extractor is closed up tight, and pressure is applied to the oyster flesh.

By way of illustration but not by way of limitation, a pressure of 1 atm (0.1 megapascal) or higher is applied, although a pressure of about 1.1 atm (0.11 megapascal) to about 2.5 atm (0.25 megapascal) is preferred. How long the flesh is pressurized is also not critical, although a pressurization time of about 5 minutes to about 60 minutes is preferred. The temperature is then held at 75° C. to 120° C., and pressurization is accompanied by temperature rises.

During the extraction, it is not necessary to carry out stirring in such a way as to do no damage to the shucked oyster flesh, because efficient extraction is achievable without recourse to agitation according to the invention.

In this way, various effective components are efficiently extracted from the oyster flesh, and they are then efficiently dissolved in an aqueous solution in the extractor.

The amount of the extracts obtained is found to be much more increased than that extracted under normal pressure. The extraction time, too, is found to be shorter than that applied in conventional manners.

Then, the solution in which the oyster flesh extracts have been extracted from the raw oyster flesh is concentrated.

How to concentrate the aqueous solution is not critical; concentration may be carried out in such a way as to enable the extracted oyster flesh extracts to have a solid matter content of, for instance, about 15 to 45 (W/W) %.

Concentration operation may ordinarily be carried out at an elevated temperature, for instance, in the range of 60° C. to 70° C. or even higher. If a reduced-pressure, low-temperature concentration process is used, the concentration operation can then be done at lower temperatures.

As already mentioned, how to concentrate the aqueous solution is not critical; use may be made of not only the reduced-pressure, low-temperature concentration but also heating concentration at normal temperature, concentration by membrane, pressurizing/heating concentration or the like.

An alcohol solution is added to the solution concentrated to the given concentration, and the ensuing solution is stirred and allowed to stand for a given period of time until the oyster flesh extracts settle down.

Finally, the precipitates are collected and dried into dry oyster flesh extracts.

Thus, the present invention can provide a method of extracting and preparing, with an improved degree of extraction, oyster flesh extracts that contain taurine, glycogens and proteins, so-called platelet-aggregation inhibition substances containing zinc, vitamins, and other helpful substances at increased rates.

The invention is now explained with reference to FIG. 1.

As shown at No. 1 in FIG. 1, with conventional normal-pressure extraction, that is, when extraction operation was performed at 1 atm (0.1 megapascal) for 80 minutes, the extracts were found to contain 24.4 mg of Zn, 125.4 μg of Se, 4.22 mg of Fe and 4.73 mg of Cu per 100 grams, and 772.2 g of dried matter providing oyster flesh extracts were collected from 20 kg of shucked raw oyster flesh used.

On the other hand, with the pressure extraction, that is, when extraction operation was performed at a pressure of 1.5 atm (0.15 megapascal) for 20 minutes, the extracts were found to contain 27.74 mg of Zn, 108.6 μg of Se, 3.87 mg of Fe and 3.67 mg of Cu per 100 grams, and 958.5 g of dried matter providing oyster flesh extracts were collected from 20 kg of raw oyster flesh used. Thus, there was a significant quantitative increase.

Further, when extraction operation was effected under an increased pressure, i.e., at 1.5 atm (0.15 megapascal) for 40 minutes, the extracts were found to contain 27.74 mg of Zn, 108.6 μg of Se, 3.87 mg of Fe and 3.67 mg of Cu per 100 grams, and 1,054.8 g of dried matter were obtained from 20 kg of raw oyster flesh used.

Furthermore, when extraction operation was done under a more increased pressure, i.e., at 2 atm (0.2 mega-pascal) for 20 minutes, the extracts were found to contain 23.2 mg of Zn, 111.7 μg of Se, 2.87 mg of Fe and 3.38 mg of Cu per 100 grams, and 956.9 g of dried matter were obtained from 20 kg of raw oyster flesh used.

In addition, when extraction operation was done under an increased pressure, i.e., at 2 atm (0.2 mega-pascal) for 30 minutes, the extracts were found to contain 22.3 mg of Zn, 103.9 μg of Se, 3.17 mg of Fe and 4.49 mg of Cu per 100 grams, and 943.3 g of dried matter were obtained from 20 kg of raw oyster flesh used.

The so-called double extraction process wherein one portion of oyster flesh extracts is extracted from raw oyster flesh and another portion is then extracted from the same raw oyster is now explained.

First, oyster flesh extracts are extracted from raw oyster flesh in the so-called normal pressure state, i.e., at 1 atm (0.1 megapascal) in the same extractor as already mentioned.

This extraction, referred to as normal-pressure extraction, is carried out for a period of time of, for instance, 80 minutes to 120 minutes.

The temperature of the solution is not critical; a temperature of about 50° C. to about 80° C. is usually preferred, although temperature of lower than 50° C. or higher than 80° C. could be used.

The raw oyster flesh extracts extracted at the normal pressure are fed back into the aqueous solution in the extractor to obtain an aqueous solution in which they are dissolved.

Then, that aqueous solution is concentrated. How to concentrate the aqueous solution is not critical; concentration may be carried out in such a way as to obtain oyster flesh extracts having a solid matter content of about 15 to about 45 (W/W) %.

This concentration operation is carried out at an elevated temperature, for instance, in the range of 60° C. to 70° C. or even higher. If a reduced-pressure, low-temperature concentration process is used, the concentration operation can then be done at lower temperatures.

An alcohol solution is added to the solution concentrated to the given concentration, and the ensuing solution is allowed to stand for a given period of time until the oyster flesh extracts settle down.

Finally, the precipitates are collected and dried into dry oyster flesh extracts.

In this embodiment, the raw oyster flesh used for the first extraction is again fed back to the extractor with a solution received in it. Unlike the first extraction, the extractor is closed up tight this time, and pressure is applied to the oyster flesh.

What pressure is here applied to the oyster flesh is not critical; a pressure of 1 atm or higher, for instance, about 1.1 atm (0.11 megapascal) to about 2.5 atm (0.25 megapascal) may be applied. The pressurization time, too, is not critical; a period of time of about 5 minutes to about 60 minutes is preferable.

In this way, the rest of various useful components are efficiently extracted from the once extracted raw oyster flesh, and they are efficiently dissolved in the aqueous solution in the extractor.

The amount of the extracted extracts is an about 60% larger than that obtained by double extractions under normal pressure.

Then, the aqueous solution in which another portion of extracts has been extracted from the raw oyster flesh is concentrated, preferably by the reduced-pressure, low-temperature concentration.

Finally, an alcohol solution is added to the thus concentrated solution to allow the oyster flesh extracts to settle down, and the precipitates are dried into dry oyster flesh extracts.

Thus, the present invention can provide a method of extracting and preparing, with an improved degree of extraction, oyster flesh extracts that contain taurine, glycogens and proteins, the so-called platelet-aggregation inhibition substances containing zinc, vitamins, and other helpful substances at increased rates.

The results of the double extraction are now explained with reference to the FIG. 1 table.

As shown at No. 6 and No. 7 in FIG. 1, the double-extraction operation was carried out, which involved the first extraction at normal pressure, i.e., 1 atm (0.1 megapascal) for 80 minutes, and the second extraction using the raw oyster flesh subjected to the first extraction at an increased pressure, i.e., 1.5 atm (0.15 megapascal) for 20 minutes.

As a result, the extracts were found to contain 32.7 mg of Zn, 109.5 μg of Se, 5.84 mg of Fe and 4.11 mg of Cu per 100 g.

From 20 kg of raw oysters, 772.2 g of dried matter were obtained when the first extraction was carried out at 1 atm for 80 minutes, and 306.6 g of dried matter were obtained when the second extraction was performed under an increased pressure of 1.5 atm for 40 minutes, 1,078.8 g in all.

Further, after the extraction at normal pressure, i.e., at 1 atm for 80 minutes, the raw oyster flesh subjected to the first extraction was subjected to another extraction at an increased pressure, i.e., at 1.5 atm (0.15 megapascal) for 40 minutes.

Consequently, 100 g of extracts were found to contain 20.9 mg of Zn, 127.3 μg of Se, 4.34 mg of Fe and 4.34 mg of Cu, and from 20 kg of raw oysters, 772.2 g of dried matter were obtained at the first extraction at 1 atm for 80 minutes, and 416.5 g were obtained at the second extraction at an increased pressure, 1,188.7 g in all.

(2) Reduced-Pressure Extraction of Oyster Flesh Extracts

The reduced-pressure extraction is now explained.

First, an extractor was closed up tight and placed under a reduced pressure. Although to what degree the pressure of the extractor is reduced down is not critical; however, the extractor is brought down to a pressure of 1 atm or lower, for instance, about 0.01 atm (0.001 mega-pascal) to about 0.99 atm (0.099 megapascal), although a pressure of about 0.1 atm (0.01 megapascal) to about 0.2 atm (0.02 megapascal) is particularly preferred. How long the pressure is reduced down is not critical; however, a period of time of about 30 minutes to about 70 minutes is applied.

In this way, various effective components are efficiently extracted from raw oyster flesh, and they are efficiently dissolved in an aqueous solution in the extractor. In particular, vitamins vulnerable to denaturation and damage or their effective components are extracted intact.

In addition, the amount of the extracts obtained is found to be far larger than that obtained by extraction at an ordinary pressure of 1 atm (0.1 megapascal).

Then, the aqueous solution in which the oyster flesh extracts have been extracted from the raw oyster flesh is concentrated.

How to concentrate the aqueous solution is not critical; concentration may be carried out in such a way as to enable the extracted oyster flesh extracts to have a solid matter content of, for instance, about 15 to about 45 (W/W) %.

Concentration operation may ordinarily be carried out at an elevated temperature, for instance, in the range of 60° C. to 70° C. or even higher. If the reduced-pressure, low-temperature concentration process is used, the concentration operation can then be done at lower temperatures.

An alcohol solution is added to the solution concentrated to the given concentration, and the ensuing solution is allowed to stand for a given period of time until the oyster flesh extracts settle down.

Finally, the precipitates are collected and dried into dry oyster flesh extracts.

Thus, the instant embodiment of the invention can provide a method of extracting and preparing, with an improved degree of extraction, oyster flesh extracts that contain taurin, glycogens, proteins, the so-called platelet-aggregation inhibition substances containing zinc, and other helpful substances at increased rates. In particular, vitamins and proteins are smoothly extracted intact.

The invention is now explained with reference to FIG. 2 that is a table.

As shown at No. 1 in FIG. 2, with a conventional normal-pressure extraction, that is, when extraction operation was carried out at 1 atm for 80 minutes, 24.4 mg of Zn, 125.4 µg of Se and 4.22 mg of Fe were extracted per 100 g, and from 20 kg of shucked raw oysters, there were obtained 772.2 g of dried matter providing oyster flesh extracts.

On the other hand, with the reduced-pressure extraction, that is, when extraction operation was done under a reduced pressure of 0.1 atm (0.01 megapascal) to 0.2 atm (0.02 megapascal) for 60 minutes, 22.1 mg of Zn, 136 µg of Se and 4.8 mg of Fe were extracted per 100 g, and from 20 kg of raw oysters, 1,187 g of dried matter were obtained. Thus, much more extracts were obtained by the reduced-pressure extraction at 0.1 atm (0.01 mega-pascal) to 0.2 atm (0.02 megapascal).

When the reduced-pressure extraction was carried out for a varying extraction time, that is, when the extraction was performed at 0.1 atm (0.01 megapascal) to 0.2 atm (0.02 megapascal) for 53 minutes, 24.7 mg of Zn, 137 µg of Se and 5.08 mg of Fe were extracted per 100 g, and from 20 kg of raw oysters, 1,195 g of dried matter were obtained.

The double-extraction process is now explained.

First, oyster flesh extracts are extracted from raw oyster flesh in the so-called normal pressure state, i.e., at 1 atm in the same extractor as already mentioned.

This extraction, referred to as normal-pressure extraction, is carried out for a period of time of, for instance, 80 minutes to 120 minutes.

The temperature of the solution is not critical; a temperature of about 50° C. to 80° C. is usually preferred, although temperature of lower than 50° C. or higher than 80° C. could be used.

The raw oyster flesh extracts extracted at the normal pressure are fed back into the aqueous solution in the extractor to obtain an aqueous solution in which they are dissolved.

Then, that aqueous solution is concentrated. How to concentrate the aqueous solution is not critical; concentration may be carried out in such a way as to obtain oyster flesh extracts having a solid matter content of about 15 to about 45 (W/W) %.

This concentration operation is carried out at an elevated temperature, for instance, in the range of 60° C. to 70° C. or even higher. If the reduced-pressure, low-temperature concentration process is used, the concentration operation can then be done at lower temperatures, as already mentioned.

An alcohol solution is added to the solution concentrated to the given concentration, and the ensuing solution is allowed to stand for a given period of time until the oyster flesh extracts settle down.

Finally, the precipitates are collected and dried into dry oyster flesh extracts.

In the instant embodiment, the raw oyster flesh used for the first extraction is again fed back into the extractor with a solution received in it. Unlike the first extraction, the extractor is closed up tight and placed under a reduced pressure this time.

Although to what degree the pressure of the extractor is reduced down is not critical; however, the extractor is brought down to a pressure of 1 atm or lower, for instance, about 0.01 atm (0.001 megapascal) to about 0.99 atm (0.099 megapascal), although a pressure of about 0.1 atm (0.01 megapascal) to about 0.2 atm (0.02 mega-pascal) is particularly preferred. How long the pressure is reduced down is not critical; however, a period of time of about 30 minutes to about 70 minutes is applied.

In this way, the rest of various effective components are efficiently extracted out of the once extracted raw oyster flesh, and they are efficiently dissolved in the aqueous solution in the extractor.

The amount of the extracts obtained is much larger than that obtained by ordinary normal-pressure extraction.

Then, the aqueous solution in which another portion of extracts has been extracted from the raw oyster flesh is concentrated, preferably by the reduced-pressure, low-temperature concentration process.

Finally, an alcohol solution is added to the thus concentrated solution to allow the oyster flesh extracts to settle down, and the precipitates are dried into dry oyster flesh extracts.

Even with the double-extraction, it is thus possible to extract and prepare oyster flesh extracts with an improved degree of extraction, which contain larger amounts of taurine, glycogens and proteins, the so-called platelet-aggregation inhibition substances such as zinc, and other useful substances. In particular, vitamins and proteins can be extracted intact.

(3) Selective Extraction Process Enabling Oyster Flesh Extracts to be Extracted by Either Pressure Extraction or Reduced-Pressure Extraction How to carry out the so-called selective extraction process to selectively increase or decrease the internal pressure of the extractor is now explained.

This selective extraction process is usually carried out with reference to data in a computer.

In consideration of the merits of the pressure extraction and the merits of the reduced-pressure extraction, the extraction considered most preferred or desired at the time of extraction is selected.

The differences in principle between the pressure extraction and the reduced-pressure extraction are now explained.

The pressure extraction harnesses a phenomenon where, upon pressurization, oyster flesh components move around vigorously in oyster flesh cells so that they run out of the cells through their membranes, resulting in dissolution in an aqueous solution. Therefore, the pressure extraction works for the extraction of components at deep sites of the oyster flesh cells, for instance, components in mitochondria.

With the reduced-pressure extraction, on the other hand, the external pressure of oyster flesh cells becomes lower than the internal pressure, so that components are sucked out of the cells for extraction and dissolution.

Therefore, the reduced-pressure extraction works especially for the extraction of components at or near the surfaces of the oyster flesh cells.

Another merit of the pressure extraction is that more oyster flesh extracts can be obtained within a shorter period of time. The pressure extraction is also favorable for the extraction of more trace elements highly stable to pressurization, for instance, zinc or Zn, selenium or Se, iron or Fe, etc.

On the contrary, the reduced-pressure extraction makes use of a situation under a reduced pressure, where there is no or little temperature rise due to a decreased boiling point.

In other words, the reduced-pressure extraction works for the extraction of nutrient components relatively susceptible of denaturation as by heating such as vitamins and proteins, and especially trace vitamin elements found on cell surfaces.

Further, whether the pressure extraction or the reduced-pressure extraction is preferred for the extraction of oyster flesh extracts is determined, for instance, in consideration of data on the state (thick or thin), weight and so on of raw oyster flesh.

Reference is now made to the case where the pressure extraction is selected in the selective extraction step.

First of all, the extractor is closed up tight, and pressurized.

By way of example but not by way of limitation, a pressure of 1 atm or higher is applied for pressurization, although a pressure of about 1.1 atm to about 2.5 atm is preferred. How long the extractor is pressurized is also not critical, although a pressurization time of about 5 minutes to about 60 minutes is preferred. The temperature is then held at 75° C. to 120° C., and pressurization is accompanied by temperature rises.

During the extraction, it is not necessary to carry out stirring in such a way as to do no damage to the shucked oyster flesh in the extractor, because efficient extraction is achievable without recourse to agitation according to the invention. Stirring may possibly do damage to the effective components to be extracted.

In this way, various effective components are efficiently extracted from raw oyster flesh. They are then efficiently dissolved in an aqueous solution in the extractor.

The amount of the extracts obtained is found to be much more increased than that extracted under normal pressure. The extraction time, too, is found to be far shorter than that applied in conventional manners, and even so, the same amount of extracts is obtainable.

Then, the solution in which the oyster flesh extracts have been extracted from the raw oyster flesh is concentrated.

How to concentrate the aqueous solution is not critical; concentration may be carried out in such a way as to enable the oyster flesh extracts to have a solid matter content of, for instance, about 15 to about 45 (W/W) %.

Concentration operation may ordinarily be carried out at an elevated temperature, for instance, in the range of 60° C. to 70° C. or even higher. If a reduced-pressure, low-temperature heating concentration process is used, the concentration operation can then be done at lower temperatures.

An alcohol solution is added to the solution concentrated to the given concentration, and the ensuing solution is typically stirred and allowed to stand for a given period of time until the oyster flesh extracts settle down.

Finally, the precipitates are collected and dried into dry oyster flesh extracts.

Thus, the present invention can provide a method of extracting and preparing, with an improved degree of extraction, oyster flesh extracts that contain the so-called platelet-aggregation inhibition substances containing taurine, glycogens, proteins, zinc, vitamins, and other helpful substances at increased rates.

The double-extraction process is now explained.

First, oyster flesh extracts are extracted from raw oyster flesh in the so-called normal pressure state, i.e., at 1 atm in the same extractor as already mentioned.

This extraction, referred to as normal-pressure extraction, is carried out for a period of time of, for instance, 80 minutes to 120 minutes.

The temperature of the solution is not critical; a temperature of about 50° C. to 80° C. is usually preferred, although temperature of lower than 50° C. or higher than 80° C. could be used.

The raw oyster flesh extracts extracted at the normal pressure are fed back into the aqueous solution in the extractor to obtain an aqueous solution in which they are dissolved.

Then, that aqueous solution is concentrated. How to concentrate the aqueous solution is not critical; concentration may be carried out in such a way as to obtain oyster flesh extracts having a solid matter content of about 15 to about 45 (W/W) %.

An alcohol solution is added to the solution concentrated to the given concentration, and the ensuing solution is let stand for a given period of time until oyster flesh extracts settle down.

The precipitates are collected and dried into dry oyster flesh extracts.

In this embodiment, the raw oyster flesh subjected to the aforesaid extraction is again placed in the extractor with a solution stored therein. Unlike the former case, the extractor is closed up tight and pressurized this time.

To what degree the extractor is pressurized is not critical, although a pressure of 1 atm or higher, for instance, a pressure of about 1.1 atm to about 2.5 atm is preferably applied. The pressurization time is not critical, too, although a time of about 5 minutes to about 60 minutes is applied.

Thus, the rest of various effective components is extracted from the raw oyster flesh that has once been subjected to extraction, and they are efficiently dissolved in the aqueous solution in the extractor.

The amount of the extracts obtained is found to be an about 60% larger than that obtained by the double-extraction process under normal pressure.

Then, the aqueous solution in which another portion of the oyster flesh extracts is extracted from the raw oyster flesh is concentrated, again preferably by the reduced-pressure, low-temperature heating concentration.

Then, an alcohol solution is added to the obtained concentrated solution to precipitate out the oyster flesh extracts, and they are dried into dried oyster flesh extracts.

Thus, the present invention can provide a method of extracting and preparing, with an improved degree of extraction, oyster flesh extracts that contain taurine, glycogens, proteins, the so-called platelet-aggregation inhibition substances such as zinc, vitamins, and other helpful substances at increased rates.

Reference is now made to the case where the reduced-pressure extraction is chosen.

When the reduced-pressure extraction is chosen, for instance, there is no or little temperature rise because of a decreased boiling point typically in a reduced-pressure state.

The reduced-pressure extraction works for the extraction of more trace elements relatively susceptible to denaturation as by heating, for instance, vitamins and proteins.

To what degree the pressure is reduced down is not critical; a pressure of 1 atm or lower is applied, although, by way of example, a pressure of about 0.01 atm to about 0.99 atm, especially about 0.1 atm or about 0.2 atm is preferred. How long the pressure is brought down, too, is not critical, although a period of time of about 30 minutes to about 70 minutes is applied.

In this way, various effective components are efficiently extracted out of raw oyster flesh, and they are efficiently dissolved in the aqueous solution in the extractor. Especially easy-to-denature or easy-to-damage vitamins and proteins are extracted or their effective components are extracted intact.

In addition, the amount of the extracts obtained is found to be much larger than that obtained by ordinary extraction at normal pressure of 1 atm.

Then, the aqueous solution in which the oyster flesh extracts have been extracted from the raw oyster flesh is concentrated.

How to concentrate the aqueous solution is not critical; that is, the aqueous solution may be concentrated in such a way as to allow the oyster flesh extracts to have a solid matter content of, for instance, about 15 to about 45 (W/W) %.

An alcohol solution is added to the solution concentrated to the given concentration, and let stand for a given period of time until the oyster flesh extracts settle down.

The precipitates are collected and dried into dry oyster flesh extracts.

Thus, the present invention can provide a method of extracting and preparing, with an improved degree of extraction, oyster flesh extracts that contain taurine, glycogens, proteins, the so-called platelet-aggregation inhibition substances such as zinc, vitamins, and other helpful substances at increased rates. In particular, the invention enables vitamins and proteins to be smoothly extracted intact.

The double-extraction process is now explained.

First, oyster flesh extracts are extracted from raw oyster flesh in the so-called normal pressure state, i.e., at 1 atm in the same extractor as already mentioned.

This extraction, referred to as normal-pressure extraction, is carried out for a period of time of, for instance, 80 minutes to 120 minutes.

The temperature of the solution is not critical; a temperature of about 50° C. to 80° C. is usually preferred, although temperature of lower than 50° C. or higher than 80° C. could be used.

The raw oyster flesh extracts extracted at the normal pressure are fed back into the aqueous solution in the extractor to obtain an aqueous solution in which they are dissolved.

Then, that aqueous solution is concentrated. How to concentrate the aqueous solution is not critical; concentration may be carried out in such a way as to obtain oyster flesh extracts having a solid matter content of about 15 to about 45 (W/W) %.

An alcohol solution is added to the solution concentrated to the given concentration, and the ensuing solution is typically stirred and allowed to stand for a given period of time until the oyster flesh extracts settle down.

Finally, the precipitates are collected and dried into dry oyster flesh extracts.

In the instant embodiment, the raw oyster flesh used for the first extraction is again fed back into the extractor with the solution received in it. Unlike the first extraction, the extractor is closed up tight and placed under a reduced pressure this time.

Although to what degree the pressure of the extractor is reduced down is not critical; however, the extractor is brought down to a pressure of 1 atm or lower, for instance, about 0.001 atm to about 0.99 atm, although a pressure of about 0.1 atm to about 0.2 atm is particularly preferred. How long the pressure is reduced down is not critical; however, a period of time of about 30 minutes to about 70 minutes is applied.

In this way, the rest of various effective components are efficiently extracted out of the once extracted raw oyster flesh from, and they are efficiently dissolved in the aqueous solution in the extractor.

The amount of the extracts obtained is much larger than that obtained by an ordinary single extraction operation under normal pressure.

Then, the aqueous solution in which another portion of extracts has been extracted from the raw oyster flesh is concentrated, preferably by heating concentration at low temperature under reduced pressure.

Finally, an alcohol solution is added to the thus concentrated solution to allow the oyster flesh extracts to settle down, and the precipitates are dried into dry oyster flesh extracts.

Thus, the instant embodiment of the invention can provide a double-extraction method of extracting and preparing, with an improved degree of extraction, oyster flesh extracts that contain taurine, glycogens, proteins, the so-called platelet-aggregation inhibition substances such as zinc, and other helpful substances at increased rates. In particular, vitamins and proteins are smoothly extracted intact.

(4) Application of the Reduced-Pressure, Low-Temperature Heating Concentration to the Concentration Step (a) Pressure Extraction Using the Reduced-Pressure, Low-Temperature Heating Concentration Process Reference is now made to one preferable embodiment of the pressure extraction of extracting oyster flesh extracts in an extractor that is closed up tight and pressurized, wherein the reduced-pressure, low-temperature heating concentration process is applied to the concentration step.

By way of example but not by way of limitation, a pressure of 1 atm (0.1 megapascal) or higher is applied for pressurization, although a pressure of about 1.1 atm to about 2.5 atm is preferred. How long the extractor is pressurized is also not critical, although a pressurization time of about 5 minutes to about 60 minutes is preferred. The temperature is then held at 75° C. to 120° C., and pressurization is accompanied by temperature rises.

During the extraction, it is not necessary to carry out stirring in such a way as to do no damage to the shucked oyster flesh in the extractor, because efficient extraction is achievable without recourse to agitation according to the invention.

In this way, various effective components are efficiently extracted from raw oyster flesh. They are then efficiently dissolved in an aqueous solution in the extractor.

The amount of the extracts obtained is found to be much more increased than that extracted under normal pressure. The extraction time, too, is found to be far shorter than that applied in conventional manners.

Then, the solution in which the oyster flesh extracts have been extracted from the raw oyster flesh is concentrated.

Here, the aqueous solution is concentrated by reduced-pressure, low-temperature heating concentration process in such a way as to obtain oyster flesh extracts having a dry matter content of, for instance, about 15 to about 45 (W/W) %.

Concentration operation may ordinarily be carried out at an elevated temperature, for instance, in the range of 60° C. to 70° C. or even higher. If the reduced-pressure, low-temperature heating concentration process is used, the concentration operation can then be done at lower temperatures (60° C. or lower).

It has now been found that the reduced-pressure, low-temperature heating concentration, i.e., the concentration operation by heating at low temperature is an all-important factor for the extraction of oyster flesh extracts.

It has already been found that as a solution of proteins that are oyster flesh extracts is held in a high-temperature state, it causes them to condense hard; however, in a low-temperature state, they condense gently. As the gently condensing proteins exist in the solution, their area of contact with the solution becomes large.

For instance, it is understood that low-temperature pasteurized milk is better in digestibility than high-temperature one, because the area of contact with digestive fluid of proteins in the low-temperature pasteurized milk is larger than that of proteins in the high-temperature one.

The proteins denature and settle down by contact with an alcohol solution, as described with reference to the next precipitation step. At this time, the gently condensing proteins are larger in the area of contact with the alcohol solution than the proteins condensed hard. Thus, the gently condensing proteins are likely to denature and settle down.

Thus, the reduced-pressure, low-temperature heating concentration ensures gentle condensation of proteins extracted from raw oysters, whereby the area of contact of the proteins with the alcohol is larger than that of proteins condensed at high temperatures, resulting in precipitation of a lot more proteins, from which a lot more dry matter can be obtained.

Thus, an alcohol solution is added to the solution concentrated to the given concentration, after which the ensuing solution is stirred.

After stirring, the solution is separated into a supernatant portion and a precipitate portion at a ratio of 0.5 to 2.5:95 to 7.5.

With a conventional concentration process, a concentration solution is separated into a supernatant portion and a precipitate portion at a ratio of only about 5.8 to about 4.2; the proportion of the supernatant portion is relatively high. As a result, the amount of dry matter obtained by drying the precipitates becomes relatively small. With the reduced-pressure, low-temperature heating concentration used herein, however, there is a significant increase in the amount of dry matter.

Thus, the precipitates obtained in larger amounts relative to the supernatant are dried into dry oyster flesh extracts.

FIG. 3 is illustrative of the contents of trace elements in 100 g of dry oyster flesh extracts in the case of normal-pressure (1 atm) heating concentration, and in the case of reduced-pressure (0.1 atm) heating concentration. To make clear differences between the results, oyster flesh extracts were extracted from raw oyster flesh in a conventional extraction process, and oyster flesh extracts obtained by heating in a normal-pressure (1 atm) state were used.

As can be seen from FIG. 3, 26.0 mg of zinc or Ze, 78 μg of selenium or Se and 2.38 g of extracts are contained per 100 g in the case of normal-pressure heating concentration, whereas the elements and extracts are contained in more increased amounts per 100 g in the case of the reduced-pressure heating concentration: 31.4 mg of zinc or Ze, 101 μg of selenium or Se and 2.64 g of extracts.

These results show that as the alcohol solution is added to the concentrated solution obtained in the normal-pressure thermal concentration process, it allows essential trace elements such as zinc (Ze) and selenium (Se) present ordinarily in the supernatant to be precipitated and collected (together with gently denatured proteins).

In other words, it has been found that with the reduced-pressure, low-temperature heating concentration, the effective components in the concentrated solution can be efficiently passed into the precipitate portion without being left in the supernatant portion.

With the reduced-pressure, low-temperature heating concentration, it is thus possible to achieve a method of preparing oyster flesh extracts by extraction, concentration, precipitation and collection, which enables trace elements containing various effective components such as zinc (Ze) and selenium (Se) to be contained therein with high contents and a high degree of extraction. The advantage could be much more enhanced by a combination of pressure extraction and reduced-pressure, low-temperature heating concentration.

The double-extraction process using the reduced-pressure, low-temperature concentration process is now explained.

In the double-extraction process, too, the content and the degree of extraction of zinc (Ze) and selenium (Se) could be much more improved if the reduced-pressure, low-temperature heating concentration is applied to its concentration step.

First of all, oyster flesh extracts are extracted from raw oyster flesh in an extractor in the so-called normal-pressure or 1 atm state.

This extraction, referred to as the normal-pressure extraction, is carried out for, e.g., 80 minutes to 120 minutes.

Here, the temperature of the solution used is not critical; a temperature of about 50° C. to about 80° C. is usually applied, although temperature of lower than 50° C. or higher than 80° C. could be used.

Then, the raw oyster flesh extracts extracted at the normal pressure are fed into a solution in the extractor, in which they are dissolved, giving an aqueous solution.

Then, that aqueous solution is concentrated.

To this end, the aforesaid reduced-pressure, low-temperature heating concentration is carried out in such a way as to give oyster flesh extracts having a solid matter content of about 15 to about 45 (W/W) %.

An alcohol solution is then added to the solution concentrated to the given concentration, and the ensuing solution is let stand for a given period of time until oyster flesh extracts settle down.

The precipitates are collected and dried into dry oyster flesh extracts.

In this embodiment, the once extracted raw oyster flesh is again placed in the extractor with a solution stored therein. Unlike the former case, the extractor is closed up tight and pressurized this time.

To what degree the extractor is pressurized is not critical, although a pressure of 1 atm or higher, for instance, a pressure of about 1.1 atm to about 2.5 atm is preferably applied. The pressurization time is not critical, too, although a time of about 5 minutes to about 60 minutes is applied.

Thus, the rest of various effective components are efficiently extracted from the once extracted raw oyster flesh, and they are efficiently dissolved in the aqueous solution in the extractor.

The amount of the extracts obtained is found to be an about 60% larger than that obtained by the double-extraction process under normal pressure.

Then, the aqueous solution in which another portion of oyster flesh extracts are extracted from the raw oyster flesh is concentrated, again by the reduced-pressure, low-temperature heating concentration.

Then, an alcohol solution is added to the obtained concentrated solution to precipitate out the oyster flesh extracts, and they are dried into dried oyster flesh extracts.

(b) Reduced-Pressure Extraction Using the Reduced-Pressure, Low-Temperature Heating Concentration Reference is now made to one preferable embodiment of the reduced-pressure extraction of oyster flesh extracts in an extractor closed up tight and put under reduced pressure, to which the reduced-pressure, low-temperature heating concentration process is applied.

First of all, the extractor is closed up tight and put under a reduced pressure.

Although to what degree the pressure of the extractor is reduced down is not critical; however, the extractor is brought down to a pressure of 1 atm or lower, for instance, about 0.01 atm to about 0.99 atm, although a pressure of about 0.1 atm to about 0.2 atm is particularly preferred. How long the pressure is reduced down is again not critical; however, a period of time of about 30 minutes to about 70 minutes is applied.

In this way, various effective components are efficiently extracted out of the raw oyster flesh, and they are efficiently dissolved in the aqueous solution in the extractor. In particular, vitamins and proteins vulnerable to denaturation and damage or their effective components can be extracted intact.

In addition, the amount of the extracts obtained is found to be much larger than that obtained by a conventional normal-pressure or 1 atm extraction.

Then, the aqueous solution in which the oyster flesh extracts been extracted from the raw oyster flesh is concentrated.

Here, the aforesaid reduced-pressure, low-temperature heating concentration process is applied to the concentration of the aqueous solution in such a way as to obtain oyster flesh extracts having a solid matter content of, for instance, about 15 to about 45 (W/W) %.

The reduced-pressure, low-temperature heating concentration, i.e., the concentration operation by heating at low temperature is an all-important factor for the extraction of oyster flesh extracts, as previously noted.

It has already been found that as a solution of proteins that are oyster flesh extracts is held in a high-temperature state, it causes them to condense hard; however, in a low-temperature state, they condense gently. As the gently condensing proteins exist in the solution, their area of contact with the solution becomes large.

For instance, it is understood that low-temperature pasteurized milk is better in digestibility than high-temperature one, because the area of contact with digestive fluid of proteins in the low-temperature pasteurized milk is larger than that of proteins in the high-temperature one.

The proteins denature and settle down by contact with an alcohol solution. In this case, the gently condensing proteins are larger in the area of contact with the alcohol solution than the proteins condensed hard. Thus, the gently condensing proteins are likely to denature and settle down.

Thus, the reduced-pressure, low-temperature heating concentration ensures gentle condensation of proteins extracted from raw oysters, whereby the area of contact of the proteins with the alcohol is larger than that of proteins condensed at high temperatures, resulting in precipitation of a lot more proteins, from which a lot more dry matter can be obtained. In addition, increased amounts of effective components such as zinc and selenium can be obtained together with the precipitates.

Then, the alcohol solution is added to the solution concentrated to the given concentration, and the ensuing solution is let stand for a given period of time until the oyster flesh extracts settle down.

Finally, the precipitates are collected and dried into dry oyster flesh extracts.

Reference is now made to the double-extraction using the reduced-pressure, low-temperature heating concentration process.

First of all, oyster flesh extracts are extracted from raw oyster flesh in an extractor in the so-called normal-pressure or 1 atm state.

This extraction, referred to as the normal-pressure extraction, is carried out for a period of time, e.g., 80 minutes to 120 minutes.

Here, the temperature of the solution used is not critical; a temperature of about 50° C. to about 80° C. is usually applied, although temperature of lower than 50° C. or higher than 80° C. could be used.

Then, the raw oyster flesh extracts extracted at the normal pressure are fed into a solution in the extractor, in which they are dissolved, giving an aqueous solution.

Then, that aqueous solution is concentrated. To this end, the aforesaid reduced-pressure, low-temperature heating concentration is carried out in such a way as to give oyster flesh extracts having a solid matter content of about 15 to about 45 (W/W) %.

An alcohol solution is then added to the solution concentrated to the given concentration, and the ensuing solution is let stand for a given period of time until the oyster flesh extracts settle down.

The precipitates are collected and dried into dry oyster flesh extracts.

In this embodiment, the once extracted raw oyster flesh is again placed in an extractor with a solution stored therein. Unlike the former case, the extractor is closed up tight and put under a reduced pressure this time.

To what degree the pressure of the extractor is reduced down is not critical, although a pressure of 1 atm or lower, for instance, a pressure of about 0.001 atm to about 0.99 atm, and especially about 0.1 atm to about 0.2 atm is preferably applied. How long the reduced pressure is applied is not critical, too, although a time of about 30 minutes to about 70 minutes is applied.

Thus, the rest of various effective components are efficiently extracted from the raw oyster flesh that has once been subjected to extraction, and they are efficiently dissolved in the aqueous solution in the extractor.

The amount of the extracts obtained is found to be much larger than that extracted under normal pressure.

Then, the aqueous solution in which another portion of oyster flesh extracts are extracted from the raw oyster flesh is concentrated, again by the reduced-pressure, low-temperature heating concentration.

Then, an alcohol solution is added to the obtained concentrated solution to precipitate out the oyster flesh extracts, and they are dried into dried oyster flesh extracts.

Even with the double-extraction, it is thus possible to extract and prepare oyster flesh extracts with an improved degree of extraction, which contain larger amounts of taurine, glycogens and proteins, the so-called platelet-aggregation inhibition substances such as zinc, and other useful substances. In particular, vitamins and proteins can be extracted intact.

(c) Selective Extraction Using the Reduced-Pressure, Low-Temperature Heating Concentration Process Reference is now made of one preferable embodiment of the so-called selective extraction of increasing or reducing the pressure of the closed extractor, to which the reduced-pressure, low-temperature heating concentration process is applied.

This selective extraction process is usually carried out with reference to data in a computer.

In consideration of the merits of the pressure extraction and the merits of the reduced-pressure extraction, the extraction most preferred or desired at the time of extraction is selected.

One merit of the pressure extraction is that more oyster flesh extracts can be obtained within a shorter period of time. The pressure extraction is also favorable for extraction of more trace elements less susceptible to denature or damage even upon pressurization or heating, for instance, zinc or Zn, selenium or Se, iron or Fe, etc.

On the contrary, the reduced-pressure extraction makes use of a situation under reduced pressure, where there is no or little temperature rise.

In other words, the reduced-pressure extraction works for the extraction of trace elements relatively susceptible to denaturation and damage as by heating such as vitamins and proteins, and especially trace vitamin elements found on cell surfaces.

Further, whether the pressure extraction or the reduced-pressure extraction is preferred for the extraction of oyster flesh extracts is determined, for instance, in consideration of data on the state, weight and so on of raw oyster flesh.

Reference is now made to the case where the pressure extraction is selected in the selective extraction step. In this case, the reduced-pressure, low-temperature heating concentration process is applied to the concentration step.

First, the extractor is closed up tight, and pressurized.

By way of illustration but not by way of limitation, a pressure of 1 atm or higher is applied for pressurization, although a pressure of about 1.1 atm to about 2.5 atm is preferred. How long the extractor is pressurized is also not critical, although a pressurization time of about 5 minutes to about 60 minutes is preferred. The temperature is then held at 75° C. to 120° C., and pressurization is accompanied by temperature rises.

During the extraction, it is not necessary to carry out stirring in such a way as to do no damage to the shucked oyster flesh in the extractor, because efficient extraction is achievable without recourse to agitation according to the invention. Stirring may possibly do damage to the effective components to be extracted.

In this way, various effective components are efficiently extracted from raw oyster flesh. They are then efficiently dissolved in an aqueous solution in the extractor.

The amount of the extracts obtained is found to be much more increased than that extracted under normal pressure. The extraction time, too, is found to be far shorter than that applied in conventional manners, and even so, the same amount of extracts is obtainable.

Then, the solution in which the oyster flesh extracts have been extracted from the raw oyster flesh is concentrated.

Here, the reduced-pressure, low-temperature heating concentration process is applied to the concentration of the solution.

This is carried out in such a way as to enable the extracted oyster flesh extracts to have a solid matter content of, for instance, about 15 to 45 (W/W) %.

An alcohol solution is added to the solution concentrated by the reduced-pressure, low-temperature heating concentration process to the given concentration, and the ensuing solution is stirred and allowed to stand for a given period of time until the oyster flesh extracts settle down.

Finally, the precipitates are collected, and dried, yielding dried oyster flesh extracts.

Reference is now made to the double-extraction using the reduced-pressure, low-temperature heating concentration process.

First of all, oyster flesh extracts are extracted from raw oyster flesh in an extractor in the so-called normal-pressure or 1 atm state.

This extraction, referred to as the normal-pressure extraction, is carried out for a period of time, e.g., 80 minutes to 120 minutes.

Here, the temperature of the solution used is not critical; a temperature of about 50° C. to about 80° C. is usually applied, although temperature of lower than 50° C. or higher than 80° C. could be used.

Then, the raw oyster flesh extracts extracted at the normal pressure are fed into a solution in the extractor, in which they are dissolved, giving an aqueous solution.

Then, that aqueous solution is concentrated. To this end, the aforesaid reduced-pressure, low-temperature heating concentration is carried out in such a way as to give oyster flesh extracts having a solid matter content of about 15 to 45 (W/W) %.

An alcohol solution is then added to the solution concentrated by the reduced-pressure, low-temperature heating concentration process to the given concentration, and the ensuing solution is let stand for a given period of time until the oyster flesh extracts settle down.

The precipitates are collected and dried into dry oyster flesh extracts.

In this embodiment, the raw oyster flesh once subjected to extraction is again placed in an extractor with a solution stored therein. Unlike the former case, the extractor is closed up tight and pressurized this time.

To what degree the extractor is pressurized is not critical, although a pressure of 1 atm or higher, for instance, a pressure of about 1.1 atm to about 2.5 atm. How long the extractor is pressurized is not critical, too, although a time of about 30 minutes to about 70 minutes is applied.

Thus, various effective components are again efficiently extracted from the raw oyster flesh that has once been subjected to extraction, and they are efficiently dissolved in the aqueous solution in the extractor.

The amount of the extracts obtained is found to be an about 60% larger than that extracted by double extractions under normal pressure.

Then, the aqueous solution in which another portion of oyster flesh extracts are extracted from the raw oyster flesh is concentrated, again by the reduced-pressure, low-temperature heating concentration.

Then, an alcohol solution is added to the obtained concentrated solution to precipitate out the oyster flesh extracts, and they are dried into dried oyster flesh extracts.

Reference is now made to the case where the reduced-pressure extraction using the reduced-pressure, low-temperature heating concentration process is chosen.

When the reduced-pressure extraction is chosen, there is no or little temperature rise because of a decreased boiling point in a reduced-pressure state, as previously noted.

The reduced-pressure extraction works for the extraction of a lot more trace elements relatively susceptible to denaturation as by heating, for instance, vitamins or proteins.

Although to what degree the pressure of the extractor is reduced down is not critical; however, the extractor is brought down to a pressure of 1 atm or lower, for instance, about 0.01 atm to about 0.99 atm, although a pressure of about 0.1 atm to about 0.2 atm is particularly preferred. How long the pressure is reduced down is again not critical; however, a period of time of about 30 minutes to about 70 minutes is applied.

In this way, various effective components are efficiently extracted out of the raw oyster flesh, and they are efficiently dissolved in the aqueous solution in the extractor. In particular, vitamins and proteins vulnerable to denaturation and damage or their effective components can be extracted intact.

In addition, the amount of the extracts obtained is found to be much larger than that obtained by a conventional normal-pressure or 1 atm extraction.

Then, the aqueous solution in which the oyster flesh extracts have been extracted from the raw oyster flesh is concentrated.

Here, the aforesaid reduced-pressure, low-temperature heating concentration process is applied to the concentration of the aqueous solution in such a way as to obtain oyster flesh extracts having a solid matter content of, for instance, about 15 to about 45 (W/W) %.

Then, the alcohol solution is added to the solution concentrated to the given concentration, and the ensuing solution is let stand for a given period of time until the oyster flesh extracts settle down.

Finally, the precipitates are collected and dried into dry oyster flesh extracts.

Reference is now made to the double-extraction using the reduced-pressure, low-temperature heating concentration process.

First of all, oyster flesh extracts are extracted from raw oyster flesh in an extractor in the so-called normal-pressure or 1 atm state.

This extraction, referred to as the normal-pressure extraction, is carried out for a period of time, e.g., 80 minutes to 120 minutes.

Here, the temperature of the solution used is not critical; a temperature of about 50° C. to about 80° C. is usually applied, although temperature of lower than 50° C. or higher than 80° C. could be used.

Then, the raw oyster flesh extracts extracted at the normal pressure are fed into a solution in the extractor, in which they are dissolved, giving an aqueous solution.

Then, that aqueous solution is concentrated. To this end, the aforesaid reduced-pressure, low-temperature heating concentration is carried out in such a way as to give oyster flesh extracts having a solid matter content of about 15 to 45 (W/W) %.

An alcohol solution is then added to the solution concentrated by the reduced-pressure, low-temperature heating concentration process to the given concentration, and the ensuing solution is let stand for a given period of time until the oyster flesh extracts settle down.

The precipitates are collected and dried into dry oyster flesh extracts.

In this embodiment, the raw oyster flesh once subjected to extraction is again placed in an extractor with a solution stored therein. Unlike the former case, the extractor is closed up tight and put under a reduced pressure this time.

To what degree the pressure of the extractor is reduced down is not critical, although a pressure of 1 atm or lower, for instance, a pressure of about 0.001 atm to about 0.99 atm, and especially about 0.1 atm to about 0.2 atm is preferably applied. How long the reduced pressure is applied is not critical, too, although a time of about 30 minutes to about 70 minutes is applied.

Thus, the rest of various effective components are efficiently extracted from the once extracted raw oyster flesh, and they are efficiently dissolved in the aqueous solution in the extractor.

The amount of the extracts obtained is found to be much larger than that extracted by a single extraction under normal pressure.

Then, the aqueous solution in which another portion of oyster flesh extracts are extracted from the raw oyster flesh is concentrated, again by the reduced-pressure, low-temperature heating concentration.

Then, an alcohol solution is added to the obtained concentrated solution to precipitate out the oyster flesh extracts, and they are dried into dried oyster flesh extracts.

What we claim is:

1. A method of preparing oyster flesh extracts, comprising:
a first extraction step of placing raw oyster flesh in an extractor with a first extraction solution stored therein, and putting said raw oyster flesh in a normal pressure state of 1 atm in said extractor to extract a first portion of oyster flesh extracts from said raw oyster flesh, and feeding said first portion of oyster flesh extracts into said first extraction solution,
a first concentration step of concentrating said first extraction solution with said first portion of oyster flesh extracts fed therein under a reduced pressure in a vessel and evaporating the water content at a temperature lower than 60° C., to produce a first concentrated solution,
a first precipitation step of adding a first alcohol solution to said first concentrated solution to precipitate out said first portion of oyster flesh extracts,
a first formation step of drying precipitates obtained in said first precipitation step into dry oyster flesh extracts,
a second extraction step of again placing said raw oyster flesh used in said first extraction step in said extractor with a second extraction solution stored therein, pressurizing said raw oyster flesh to 0.1 atm and 0.2 atm in said extractor for 30 to 70 minutes to extract a second portion of oyster flesh extracts from said raw oyster flesh in a pressurized state, and feeding said second portion of oyster flesh extracts in said second extraction solution,
a second concentration step of concentrating said second extraction solution with said second portion of oyster flesh extracts fed therein to produce a second concentrated solution, in said second extraction step putting the second extraction solution under a reduced pressure in the vessel and evaporating the water content while at a temperature lower than 60° C.,
a second precipitation step of adding a second alcohol solution to said second concentrated solution to precipitate out said second portion of oyster flesh extracts, and
a second formation step of drying precipitates obtained in said second precipitation step into dry oyster flesh extracts.

2. The method of claim 1,
wherein said first extraction step is performed at a temperature of approximately 50° C., and
wherein said second extraction step is performed at a temperature of approximately 50° C.

3. The method of claim 1, wherein in said second precipitation step, alcohol solution is added to said second concentrated solution to precipitate out said second portion of oyster flesh extracts, stirring a second resultant solution, and letting the second resultant solution stand for separation into a second supernatant liquid portion and a second precipitate portion at a ratio of 0.5:9.5 to 2.5:7.5.

4. The method of claim 2, wherein in said second precipitation step, alcohol solution is added to said second concentrated solution to precipitate out said second portion of oyster flesh extracts, stirring a second resultant solution, and letting the second resultant solution stand for separation into a second supernatant liquid portion and a second precipitate portion at a ratio of 0.5:9.5 to 2.5:7.5.

* * * * *